United States Patent [19]
Appleby et al.

[11] 4,226,656
[45] Oct. 7, 1980

[54] TIRE CARCASS ASSEMBLY

[75] Inventors: Paul E. Appleby, Cuyahoga Falls; Denver C. Folden, Akron; Joseph F. Stalter, Jr., Mogadore; Harry R. Swanson, Akron, all of Ohio

[73] Assignee: The Goodyear Tire & Rubber Company, Akron, Ohio

[21] Appl. No.: 26,391

[22] Filed: Apr. 2, 1979

[51] Int. Cl.³ ...................... B29H 17/22; B29H 17/26
[52] U.S. Cl. .................................. 156/132; 156/401; 156/403; 156/416
[58] Field of Search ........ 156/123, 126, 128, 131–133, 156/394, 401, 403, 414–417

[56] References Cited

U.S. PATENT DOCUMENTS

| | | | |
|---|---|---|---|
| 3,560,301 | 2/1971 | Cantarutti | 156/401 |
| 3,692,605 | 9/1972 | Cantarutti | 156/132 |
| 3,698,987 | 10/1972 | Woodhall et al. | 156/401 |
| 3,728,194 | 4/1973 | Enders | 156/132 |
| 3,784,437 | 1/1974 | Appleby et al. | 156/132 |
| 3,833,445 | 9/1974 | Mallory et al. | 156/401 |
| 3,853,653 | 12/1974 | Olbert et al. | 156/132 |
| 3,862,871 | 1/1975 | Held et al. | 156/415 |
| 4,081,310 | 3/1978 | Shichman et al. | 156/131 |

Primary Examiner—John E. Kittle
Attorney, Agent, or Firm—R. S. Washburn

[57] ABSTRACT

Method and apparatus for assembling a tire carcass comprising a precarcass band and a pair of inextensible bead rings. The band is built and consolidated on a form having a rigid cylindrical surface. The band includes at least one cord or wire-reinforced ply and one or more tire liners of a rubbery gum, and may include additional tire components, in particular the components which will form the sidewalls of the tire. The band is removed from its building form and then moved axially freely over a shaping apparatus. An axially narrow central part of the band is expanded sufficiently to resist axial displacement of the band, which is then spread and smoothed outward from its central part by expanding and then moving outwardly a pair of expandable spreading elements. Following the spreading operation, end regions of the band are expanded to seat the prepositioned inextensible bead rings, after which the bead rings are moved axially toward each other and the band therebetween is expanded by air pressure into engagement with a circumferentially restricting ring or belt. With the carcass so expanded, the band endings are turned outwardly about the bead rings by turnup bladders while a pair of annular inner support bladders exert circumferentially uniform axially outward counterforce to squeeze the respective beads.

22 Claims, 10 Drawing Figures

TIRE CARCASS ASSEMBLY

The foregoing abstract is not to be taken as limiting the invention of this application, and in order to understand the full nature and extent of the technical disclosure of the application, reference must be made to the accompanying drawing and the following detailed description.

The present invention relates to making tires and particularly to assembling a precarcass band with its associated inextensible bead rings to build a heavy-duty tire such as a truck tire.

One of the objects of the invention is the provision of a method and apparatus adapted to carry out the method to permit constructing a complete precarcass band on a rigid cylindrical form so that the band is axially and circumferentially uniform in its construction and well consolidated before the band is placed on shaping apparatus.

An additional object of the invention is the provision of a method and a suitable apparatus for smoothing and spreading the band so as to insure the circumferential and axial uniformity in such band.

A further object is the provision of a method and an apparatus wherein the precarcass band can be built to a maximum outer diameter less than the inside diameter of the inextensible bead rings for the tire, an arrangement sometimes referred to as negative crown building.

It is also an object of the invention to provide a method and an apparatus wherein the turnup of the band about each of the bead rings is accomplished while the band adjacent to the respective sides of each of the bead rings extends radially of the bead rings at not less that 90° with respect to the drum axis axially outward of the respective bead rings. The axial spacing between the bead rings while the turnup is effected is equal to or greater than the maximum axial width of the cross section of the tire when mounted and inflated for use.

A further object of the invention is the provision of a method and suitable apparatus wherein a balanced and circumferentially uniform squeeze can be exerted in the bead region adjacent the bead rings to obtain a tight, hard, void-free bead construction in the tire.

The foregoing and other objects of the invention are accomplished by a method of forming bead portions in a tire carcass comprising: expanding circumferentially a narrow, axially central part of a carcass band sufficiently to hold said band axially; positioning two beads radially outward of said band and at a first coaxial spacing; expanding the band circumferentially initially in two narrow axial portions close to said central part and then oppositely axially outward from the central part progressively to expand and smooth said band axially outwardly from its central part toward said beads; expanding axial zones in planes respectively coplanar with said beads as so positioned to seat said beads circumferentially of said band; moving the so-seated beads axially toward said center part and further expanding said band by increasing air pressure acting radially outwardly on said band between the so-seated beads; then concurrently inflating a pair of annular bladders secured respectively adjacent to and extended axially inward from said zones to engage said band inward of each of said beads and turning the band endings about and radially outward of the beads; and pressing said endings axially inwardly while said bladders exert axially outward uniformly distributed force on said band around said beads; and completing and curing said tire carcass.

The objects hereof are accomplished by a tire carcass shaping apparatus comprising first means for engaging the inward surface of and expanding an axially central part of a precarcass band and for holding the same axially with respect to the axial length of said band, second means for engaging the inward surface of the band adjacent to and respectively spaced symmetrically outwardly of the central part and for progressively expanding and smoothing said band axially outwardly from said first means, third means respectively disposed coaxially outwardly of said second means for engaging the inward surface of the band for expanding the same radially outwardly of said second means for conforming said band to prepositioned inextensible tire beads and operable to move said beads toward said central part while said part is further expanded by air pressure, and turnup means for turning the respective axial ends of said band outward of and about said beads.

Figure 1:
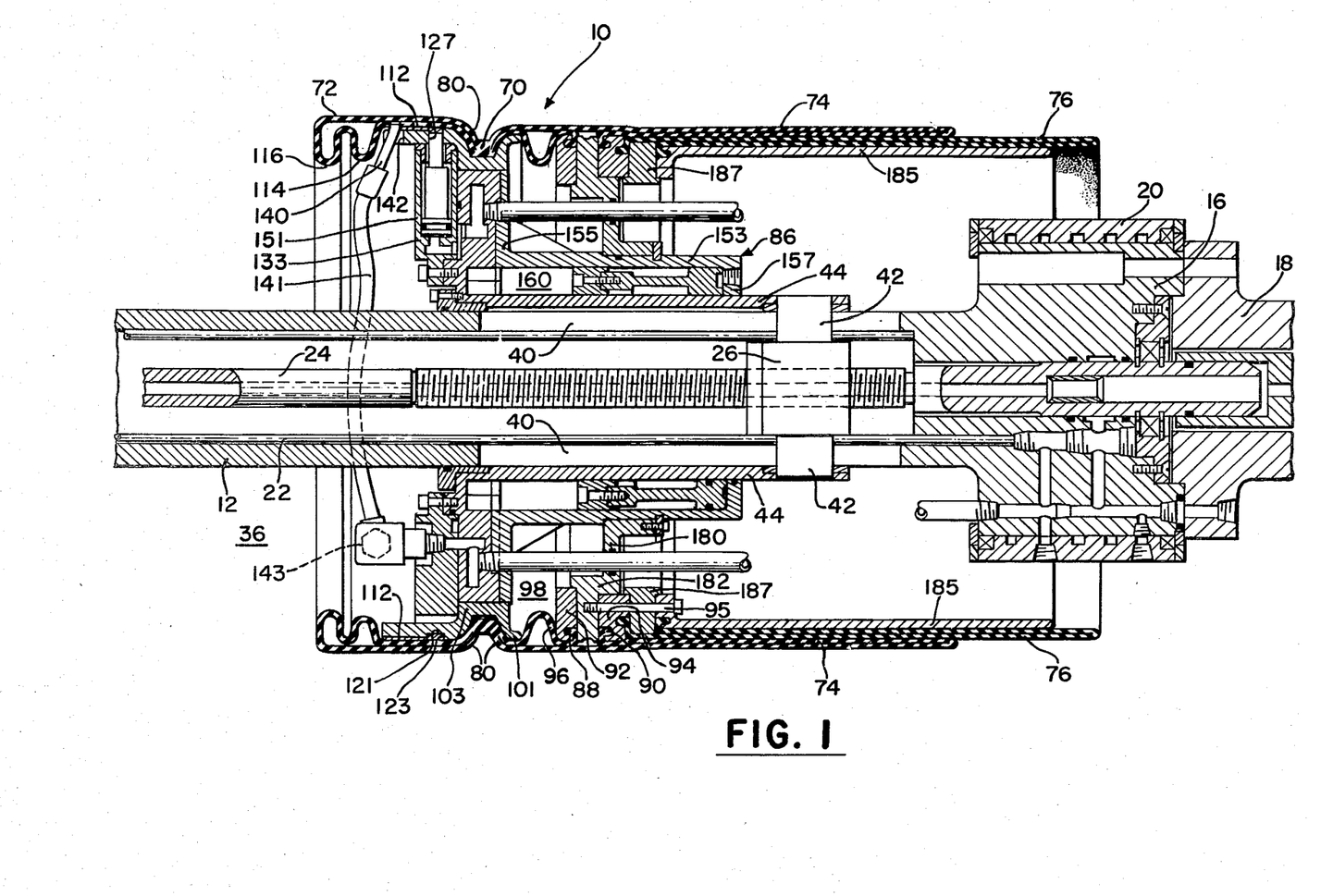
FIG. 1 is a view in axial cross-section of a part of a shaping apparatus in accordance with the invention, this part illustrating the apparatus in the minimum diameter collapsed condition allowing a preassembled band to be moved axially thereof.
Figure 2:
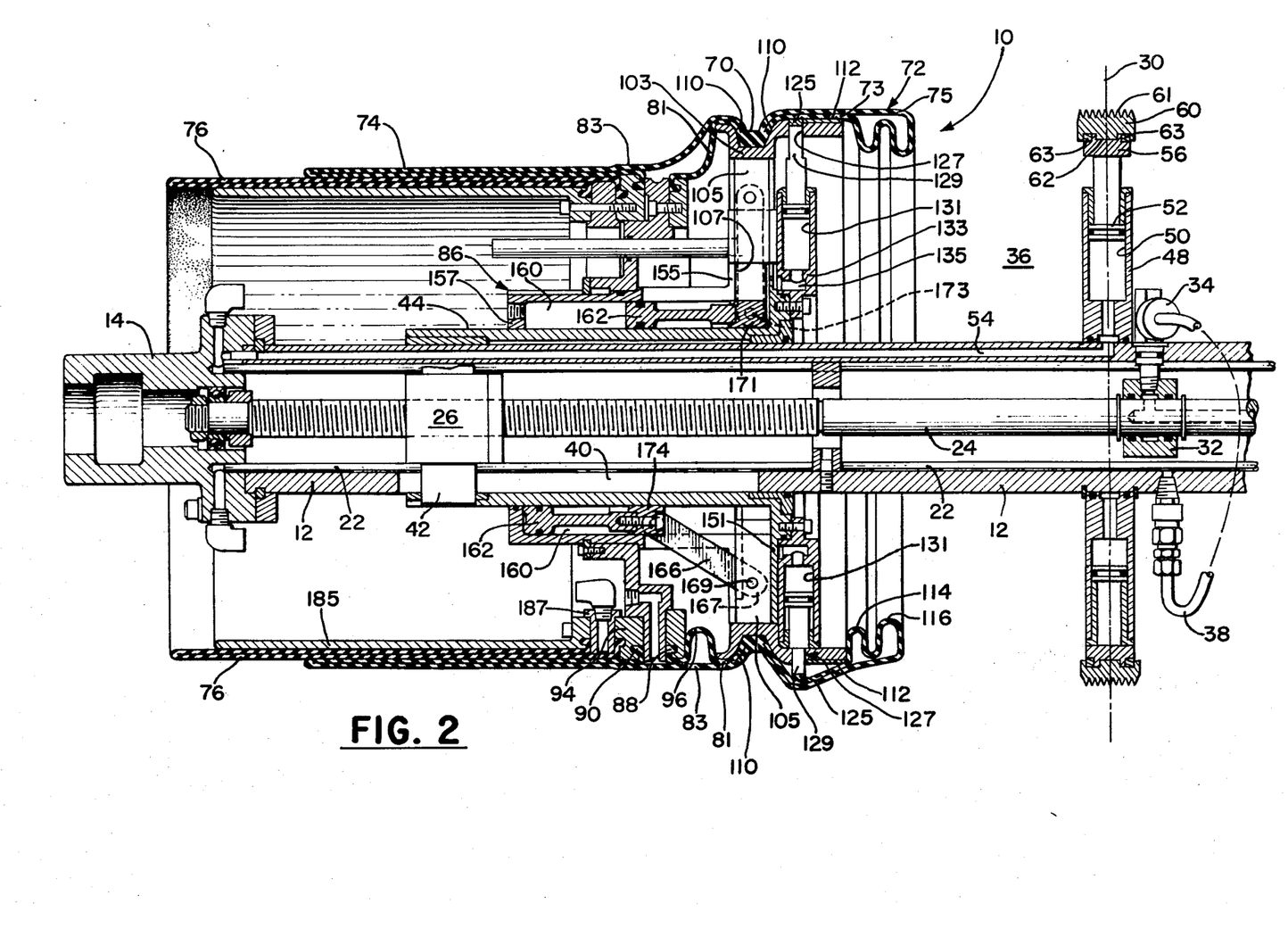
FIG. 2 is a view in axial cross-section of the remaining parts of the apparatus of FIG. 1 wherein the apparatus shown below the centerline illustrates the relation of the parts of the apparatus during an intermediate phase of its operation and the portion above the centerline illustrates a later phase of the operation of the apparatus.

The present carcass shaping apparatus 10, referring to FIGS. 1 and 2, includes a hollow center shaft 12 having an end fitting 14 adapted for cooperation with an outboard support or tailstock (not shown) and a mounting flange 16 configured for attachment to a tire machine spindle 18. The mounting flange also includes a rotary joint 20 having a plurality of passages which individually communicate with longitudinal tubes 22 placed along the inner surface of the shaft and which in turn are connected to actuate operating mechanisms presently to be described. An operating screw 24 having right and lefthand lead threaded portions is mounted coaxially in the shaft and connected to driving mechanism of the spindle which operates to rotate the screw to effect movement of the nuts 26, and carrier means further to be described presently, symmetrically toward and away from the midplane 30 normal to the shaft. A longitudinal passage in the screw is connected to a supply of controlled air pressure by way of the spindle, the passage being connected by a collar 32 to a conventional supply and quick exhaust valve 34 disposed through the wall of the shaft. Air admitted by the valve pressurizes the chamber 36 defined in part by a carcass band disposed around the apparatus. The valve is operable to exhaust air rapidly from the chamber through the tube 38 into the hollow interior of the shaft. The air pressure from the chamber thus is exhausted into the shaft and thence to the ambient atmosphere by way of the longitudinal slots 40 in the shaft wall.

Studs 42 on the nuts extend through the longitudinal slots and are connected respectively to flanged mounting sleeves 44 which are slidable longitudinally on the shaft toward and away from the plane 30.

An annular plate 48 fixed on the shaft symmetrically of the plane has an equiangularly spaced array of cylindrical bores 50 in each of which a piston 52 is radially movable in response to air delivered into the respective bore by way of the passage 54 formed in the shaft wall and connected by passages formed in the fitting 14 to one of the longitudinal tubes 22. Each of the pistons has an arcuate bar 56 fixed at its radially outer end, the bars being aligned circumferentially in a continuous array to provide a circumferential surface on which is disposed an endless elastomeric ring 60 which can be expanded circumferentially and axisymmetrically in response to pressure increase in the bores. The peripheral surface 61 of the ring which is engageable with the radially inner surface of a precarcass band is grooved circumferentially as shown in FIG. 2, so as to resist movement of the band in contact therewith axially while offering lesser resistance to circumferential movement of the band relative to the ring. The interface 62 between the expandable elastomeric ring 60 and the arcuate bars 56 underlying the ring can be of any suitable shape which retains the ring in its axially central symmetry with the plane 30. There may also be provided arcuate lengths 63 of key stock or the like set in the peripheral face of each arcuate bar 56 each to overlie a portion of the next adjacent bar so as to form a bridge across the gap between the bars and thus provide a more uniform circumferential support for the elastomeric ring.

The elastomeric ring, the bars, the pistons, and the bores in the center plate, cooperate to provide means for engaging the inward surface of and then expanding a narrow axially central part of a carcass band placed on the shaping apparatus 10 and for holding the band axially with respect to its length for purposes presently to be explained.

To effect the desired improved formation of the tire bead solidly about the inextensible bead ring, the apparatus includes a pair of turnup means each comprising an endless elastic beadseating ring 70, an axially inner support bladder 72, a primary turnup bladder 74, and a secondary turnup bladder 76. The support bladder is an elastic membrane having reinforcing cords extending at equal and opposite angles of about 82 degrees with respect to its circumference which cords are embedded in the beadseating ring 70 and extend radially and axially outward from the ring so as to form one side of a flared groove 80. The primary turnup bladder 74 is an elastomeric membrane having reinforcement cords extending at equal and opposite angles of about 82 degrees with respect to its circumference, the cord angles being identical to the cord angles of the support bladder 72 and similarly embedded in the ring 70. Other angular arrangements of the reinforcement cords, from about 68 degrees to 90 degrees to the circumference, the same being from about 22 degrees to 0 degrees with respect to the drum axis, can be used in the bladders 72 and 74. The inner 81 and outer 83 annular walls of the bladder 74 extend radially and axially outwardly from the ring 70 and form from the radially outer surface of the ring 70 the other side of the flared beadseating groove 80 which groove is thus generally trapezoidal in form and extends concentrically of the shaft. The support bladder 72 while uninflated extends axially from the ring 70 toward the center ring 60, being unsupported in the axial between the ring 60 and the ring support segments 103.

The primary turnup bladder 74 when uninflated extends axially outward from the seating ring 70, being supported on the uninflated secondary turnup bladder 76. The inner wall 81 of the primary turnup bladder is in two parts the respective edges 88, 90 of which are clamped by the clamp rings 92, 94 to the carrier assembly 86. Between the seating ring 70 and the associated edge 88 of the inner wall part an accordian plate 96 is formed in the inner wall to extend radially inwardly in a space 98 between the ring 70 and the lips 101 of the ring support segments 103 which are movable radially of the shaft 12 to expand the seating ring 70. The pleat so formed accommodates the movement of the segments 103 relative to the carrier assembly 86 and maintains the inflation integrity of the primary turnup bladder 74, reducing or eliminating forces which could otherwise tend to dislodge the seating ring 70 and impair the accuracy of the position of the bead ring with respect to the band.

The seating ring 70 together with the adjoining portions of the axially inner support bladder 72 and the primary turnup bladder 74 cooperate to provide means for the initial seating of the inextensible bead ring in the precarcass band and for confirming the zone of the band immediately underlying the bead ring securely to the bead ring thereby contributing to an improvement in the void-free quality of the subsequently accomplished turnup.

In addition to its cooperation with the beadseating ring 70, the support bladder 72, while yet in an uninflated state, also provides an elastic circumferentially continuous element of the band spreading means presently to be described.

To support and to expand the beadseating ring 70, the seating ring support segments 103 are arranged in a concentric circumferential array about the shaft. Each of the segments is fixed on the radially outer end of a radially movable strut 105 which is slidable in a rectangular radially oriented slide 107 formed in the carrier assembly 86. The segments have an outwardly open channel 110 formed with its sides and bottom contiguous with the radially inward surfaces of the ring 70 and the adjoining portions of the support 72 and turnup 74 bladders. The channel side associated with the primary turnup bladder curves smoothly outwardly to form the lip 101 extending axially away from the plane 30. The lip terminates at the previously mentioned circumferential pleat 96 in the inner wall 81. The channel side associated with the support bladder 72 is curved outward smoothly to a cylindrical flange 112 supporting the support bladder 72 and terminating adjacent the first of the accordion pleats 114, 116 in the support bladder inner wall. The axial space between the center ring 60 and the flanges 112 accommodates the pleats 114,106 which, on reinflation of the bladder 72, permit the bladder to expand radially outward along the band as presently to be further described. The circumferential surface of the flange 112 has a circumferential groove 121 of rectangular cross-section sunk therein which groove accommodates the arcuate segments 123 of a circumferential spreader ring 125, the spreader ring being, in an initial radially inward condition, flush with the surface of the flange. Each segment 112 has a hole 127 extending radially inwardly from the bottom of the groove 121 which accommodates a piston 129 for movement radially of the axis, each of the arcuate segments 123 being affixed on a respectively associated piston 129. Each piston is slidable radially in a radial bore 131 formed in an annular disc 133 fixed on the carrier assembly, there being a plurality of equiangularly spaced bores 131 in the disc 133. The pistons are actuated by compressed air introduced into the bore, by way of the passage 135, to expand circumferentially the uninflated support bladder 72 and an axially narrow circumferential part of the carcass band disposed therearound. The arrangement provides spreading means by which a narrow circumferential part of the band can be expanded, and expanded progressively axially away from the mid-circumferential plane 30 from a location close to such plane and from such location axially away from the plane in the so-expanded state thereby spreading, wiping, tensioning, and smoothing the elements of the band axially outwardly to a location wherein the beadseating ring 70 is disposed coplanarly with a bead ring held coaxially about the shaft in appropriately axially spaced relation and radially spaced from the band. The lower part of FIG. 2 shows the expansion of the uninflated supprt bladder 72 by the arcuate segments of the spreader ring 125 before the beadseating ring 70 has been expanded.

The support bladder 72 thus has a dual function in the apparatus 10, one of which is to provide a smooth endless elastic element engageable to expand circumferentially an axially narrow part of the band and, by axial movement relative to the band, to spread and smooth and tension the band as the element is slid axially along the interior surface of the band. The second function of the support bladder is its cooperation with the primary turnup bladder, wherein the support bladder 72 and the turnup bladder 74 are each inflated to a suitable internal pressure so that the ply endings of the band outward of the associated bead ring will be turned radially outwardly around the bead ring while the inflated support bladder 72 provides a circumferentially uniformly distributed force in excess of the inflating pressure within the chamber 36. In each bladder 72 the support force is opposite and substantially equal to the force applied by the associated primary turnup bladder 74. The bead region of the tire carcass is thus consolidated and compacted by opposing axial forces which are circumferentially uniformly distributed and extend angularly outwardly along the sidwall of the carcass to or beyond the extent of the edge of the ply forming the band. Because the reinforcing cord elements of the support bladder 72 and of the primary turnup bladder 74 are embedded in the elastomeric beadseating ring 70, inflation of the bladders exerts also a uniformly distributed radially outward force acting on the periphery of each cross-section of the inextensible bead ring so as to eliminate or minimize any voids or incomplete adhesion of the band to the bead ring.

The secondary turnup bladder 76, as seen in FIGS. 1 and 2, is attached conventionally to the carrier assembly 86 and when inflated acts to move the associated primary turnup bladder 74 axially toward the plane 30.

The ring segments 123 in the retracted positions of the pistons 129 are seated in the groove 121 formed in the flanges so that their outer surfaces are flush with the outer surfaces of the respective flanges 112. Expansion of the spreading means is effected by moving the segments 123 radially relatively of the flanges which urges the elastic element 72 radially outwardly concentrically of the shaft 12 to expand slightly, that is, from 1 to about 8 percent, the circumference of a narrow axial portion of the band initially adjacent to the elastic ring 60 and so expanded, the spreading means is moved by the carrier means 86 on which it is mounted axially away from the plane 30 progressively to expand, smooth, and tension the band.

The radially inner 73 and radially outer 75 walls of the bladder 72 and the radially inner 81 and outer 83 walls of the primary turnup bladder 74 are both fixed continuously circumferentially in the beadseating ring 70 disposed in the segments 103. The surfaces of the walls 75 and 83 flare radially and axially outwardly of the ring 70 so that upon expansion of the segments 103 the zone of the precarcass band underlying the inextensible bead ring is initially conformed solidly to the bead ring. Moreover, when the bladder 72 and the primary turnup bladder 74 are inflated the tension in the respective outer walls tends to further coform and compact the zone of the band uninterruptedly around the circumference of the bead and about its cross-section thereby resulting in an unusually compact, well consolidated bead. The bladder 72 is inflated by a metal nipple 140 slidably accommodated in and freely movable of an opening 142 in the flange 112 of one of the segments 103. This nipple is connected by flexible tubing 141 to a fitting 143 on the carrier assembly 86.

The axially movable carrier assemblies are mounted slidably on the shaft 12 and connected by the studs 42 to the respectively associated nuts 26 to provide axial movement of each of the carrier assemblies equally and oppositely with respect to the plane 30. Each assembly 86 includes the sleeve 44 which has a radially outwardly extending flange 151 and a second coaxially mounted sleeve 153 having a radially outwardly extending flange 155 fixed integrally to the flange 151 of the sleeve 44 and a radially inwardly extending flange 157 at its axially outer end the inner circumference of which is fitted to the outer circumference of the sleeve 44 so as to form an annular cylinder 160 which accommodates an annular piston 162 for movement axially of the carrier assembly.

To lift the segments 103 radially of the shaft and expand to beadseating ring 70, the previously mentioned struts 105 are connected, each by a diagonal link 166 so that axial movement of the annular piston 162 provides an axisymmetric movement of the respective struts. One end 167 of each link 166 is connected by a pivot pin 169 to the associated strut inward of its radially outward end. The other end 171 of each of the links is connected by a pivot pin 173 fixed in a pair of lugs 174 spaced circumferentially on the axially inward end of the piston 162 to accommodate the ends of the links therebetween. The sleeve 153 is slotted suitably to accommodate the movement of the links from their retracted position shown in the lower part of FIG. 2 to their position shown in the upper part of FIG. 2 wherein the beadseating ring segments 103 are shown in their fully extended positions.

A flanged plate member 180 is fixed airtightly on the outer circumference of the sleeve 153 and has a radially outward flange 182 which is axially offset and extends radially as seen in FIGS. 1 and 2. The radially outward flange 182 is disposed between the edges 88, 90 of the primary bladder which edges are clamped to the flange 182 respectively by the inner ring 92 and by the outer ring 94. The secondary bladder 76 and its supporting cylinder 185 are clamped to the outer ring 94 by cap screws 95 which extend through a spacer 187 having a passage for air flow to and from the secondary bladder. The edges of the bladder 76 are clamped one at each side of the spacer 187.

Figure 3:
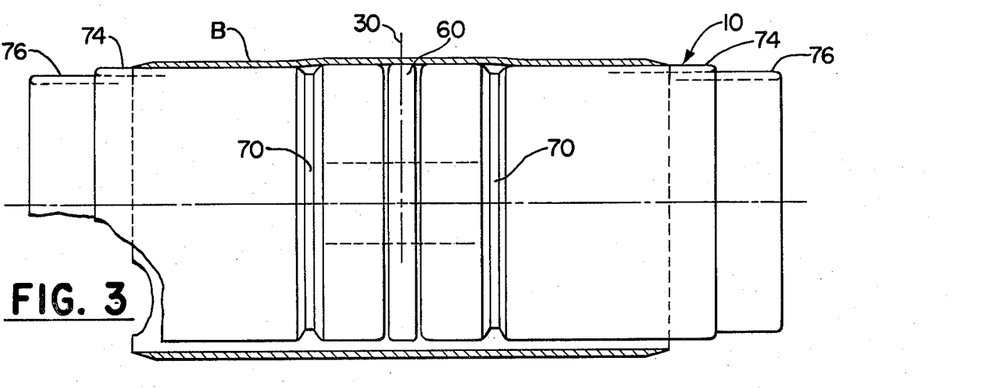
FIG. 3-9 illustrate a sequence of operations in accordance with the method hereof, illustrating the movements in the apparatus of FIGS. 1 and 2, in which the relation of parts of the apparatus and of the carcass band parts are shown out of scale to emphasize features of the invention.

In operation, the carrier assemblies 86 are moved axially toward one another and toward the plane 30 to the initial position indicated schematically in FIG. 3.

Figure 10:
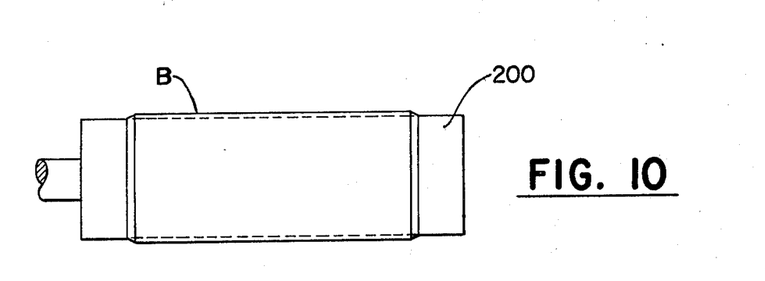
FIG. 10 is a schematic representation of a rigid cylindrical precarcass band building form.

A precarcass band B, having been completely built elsewhere, preferaly on a form 200 having a rigid cylindrical surface (FIG. 10) where the elements comprising the band can be most effectively consolidated to form a unitary band, is removed from the form and is moved axially over the shaping apparatus 10, preferably by transfer means (not shown) which can be of any known construction. The assembled band may comprise also members which will form the sidewalls of the tire carcass. The band B is of a diameter less than the inner diameter of the bead rings R to be employed in the tire carcass and correspondingly the shaping apparatus 10 in this stage is of a still lesser diameter such that the band can be moved freely axially over the apparatus.

The axial length of the band is disposed so that its mid-circumferential centerline will coincide with the reference plane 30 whereupon the first means provided by the elastomeric ring 60 and its associated operating members is actuated to expand a narrow (e.g., about 1-3 inches) axially central part C of the band sufficiently to hold the band against displacement axially of the apparatus. Such expansion is limited preferably within the range of 1 to 10 percent of the circumference and is distinct from the radial expansion of shaping, i.e. the change from a cylindrical to a toroidal condition.

Figure 4:
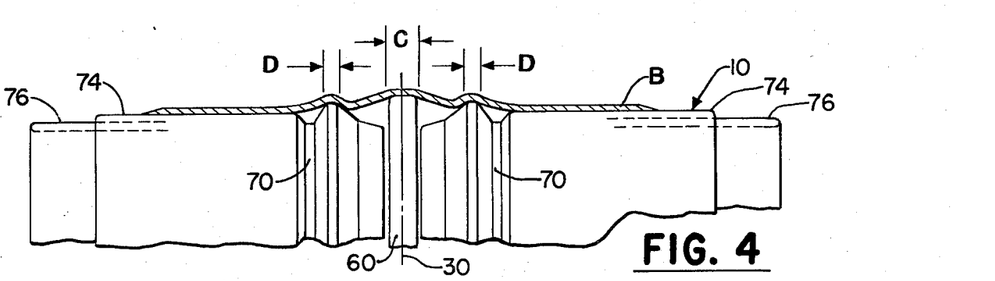

The spreading means is then similarly expanded to expand a symmetrically spaced air of axial portions D closely adjacent the central part C in the manner indicated in FIG. 4.

Figure 5:
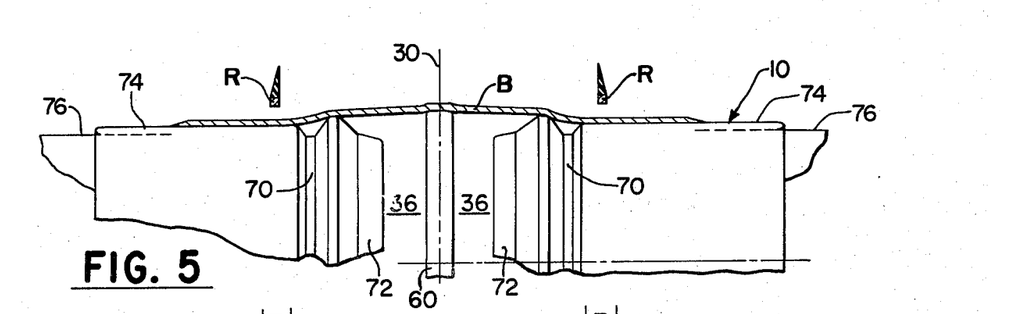

It will be noted in FIG. 5 that the inextensible bead rings R, having been positioned radially outwardly of the band and spaced axially apart symmetrically with respect to the centerplane 30 are spaced axially outwardly beyond the locus of the axial portions D initially expanded by the spreading means.

Figure 6:
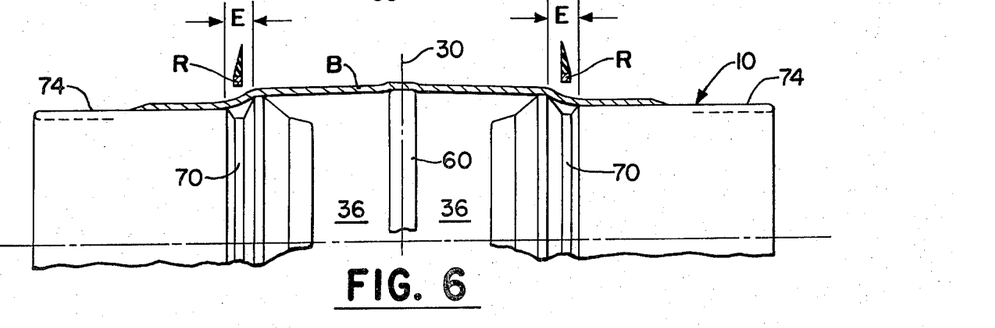
Figure 7:
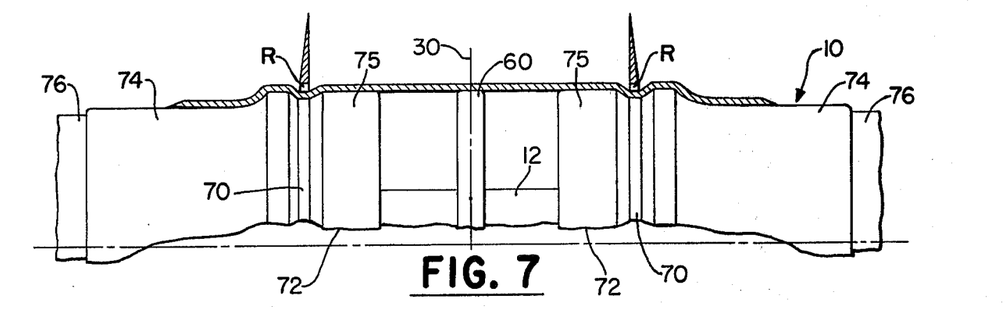

The carrier means is then moved axially as indicated in FIG. 5 to expand progressively, to smooth and to tension the band axially by sliding the inner bladder, uninflated, along the inward surface of the band away from the centerplane 30 to a distance sufficient to locate the beadseating rings 70 in axial coincidence with the band zones E underlying the bead rings, FIG. 6, whereupon the beadseating rings 70 are expanded as seen in FIG. 7, to seat the bead rings and to initiate conformation of the band in such zones about the bead rings.

The ring segments 123 of the spreader means are not retracted during this phase of operation but rather the segments 103 supporting the beadseating rings are moved radially relatively of the segments 123 thereby causing them to seat in their grooves 121 in the flanges 112 of the segments 103, as well as to cause some additional outward movement of the pistons 129 to which the ring segments are attached, in the manner illustrated in the upper portion of FIG. 2.

Having been thus seated in the band, the bead rings R are then moved toward one another symmetrically by the carrier assemblies 86.

Figure 8:
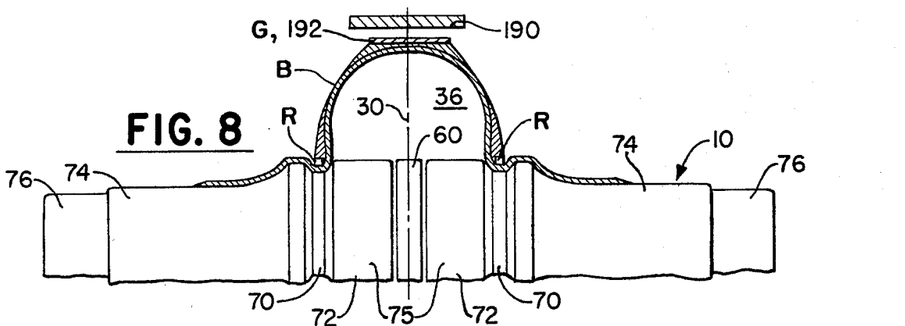

As the bead rings R are moved toward one another, the chamber 36 is pressurized to expand the band B between the bead rings into engagement with an inextensible belt G or with a belt and tread assembly which is carried in a conventional transfer ring 190 prepositioned coaxially and symmetrically as shown in FIG. 8. Alternatively, a temporary restricting means in the form of an inextensible ring 192 of radially movable segments provided as a part of the shaping apparatus can be substituted for the belt while the band endings are turned about the bead rings. Such inextensible ring preferably provides a cylindrical rigid surface whose circumference is less than the circumference of the carcass band in the tire when mounted and inflated for use.

Figure 9:
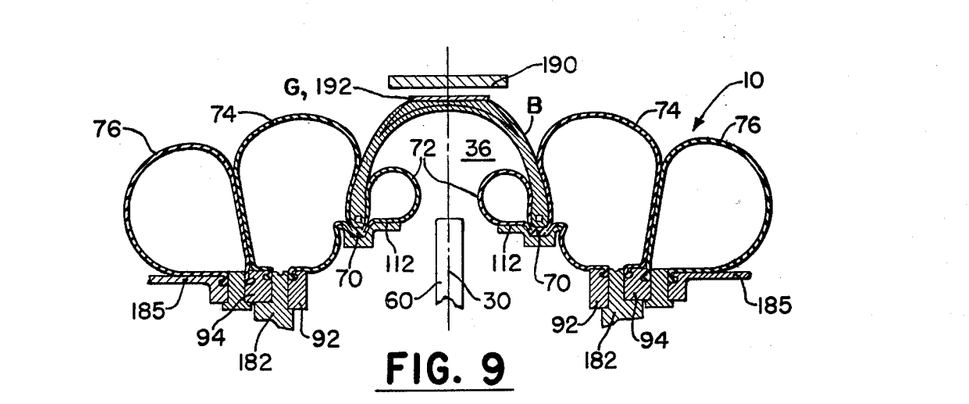

The bead rings R are continued in their inward movement by the carrier means to a spacing therebetween, FIG. 9, which is not less than the maximum axial width of the tire when mounted and inflated for use. The band portions corresponding to the sidewalls of the tire then extend radially from the bead rings at an obtuse angle, i.e., an angle greater than 90° with respect to the drum axis extending axially outwardly of the respective bead rings.

In order to turn the ply endings radially outwardly along the sidewall of the shaped carcass band B, the bladders 72 and the primary turnup bladders 74 are concurrently inflated. Each bladder 72 provides a circumferentially uniform and continuous pressure exerted axially outwardly on the bead region which pressure is opposed to and by the axially exerted pressure of the primary turnup bladder. Because the reinforcement cords of both the inner bladder and the primary turnup bladder are secured in the beadsetting rings 70, the bead regions are compacted uniformly and thoroughly to provide an unusually tight, void-free bead in the tire carcass.

The secondary turnup bladders 76 are then inflated and act to urge the respective primary bladders axially toward the carcass thereby increasing the radial extent of the primary bladders in turning up the edges of the band.

As previously mentioned, the band may include, in its original construction, members which will form the sidewalls. The sidewalls are turned partially upward along the carcass along with the ply endings as the primary turnup bladders are initially inflated. It has been found that by reducing from its maximum level the inflation pressure in the primary bladders while maintaining the inflation pressure in the secondary bladders, the radially outer portions of the sidewall can be more effectively transferred to void-free and secure contact with the carcass band so that little or even no additional stitching is required. Thus, the time required to complete a tire carcass can be proportionately reduced.

We have found a particular advantage in the present method and apparatus to result in the initial limited expansion of the center part of the carcass band combined with a somewhat lesser expansion and the movement progressively away from the center part so as to smooth, spread and tension the band before setting the bead rings as has been described in order to obtain an unusually compact, well consolidated and void-free bead in the tire carcass.

We have also discovered that the balanced axial squeeze provided in the bead region of the tire carcass by the inner bladders cooperating with the primary turnup bladders not only contributes to effective consolidation of the bead but also assures that the bead seat ring is not axially displaced at any time sufficiently to result in nonuniformities in the tires built. This seems to result in part from tying both the inner and the primary turnup bladders directly to the bead seating ring by embedding the reinforcing cords of the primary turnup bladder and of the inner support bladders in overlapping relation in the respective bead seat rings. This arrangement results in a radially exerted tension uniformly about the bead ring and about each cross-section of the bead ring which contributes to the effective consolidation of the bead portion.

The provision of the pleat 96 in the inner wall 81 of the primary turnup bladder prevents exertion of any displacing force on the beadseating ring 70 as the segments 103 underlying the bead rings are expanded but provides complete air chamber integrity for the primary bladder without the use of complicating sealing to accommodate the movements of the segments.

A further advantage of the method and apparatus described is that of seating the beads securely on the band in an initially generally cylindrical state of the band and only subsequently, after expanding the band, turning up the ply endings while the sidewalls are oriented at at least 90° with the drum axis outward of the respective bead ring and preferably so that the bead ring to bead ring spacing is not less than the maximum axial width of the tire when mounted and inflated for use. Not only is the potential for distortion of the respective components of the tire in the bead region reduced, but inserting the uncured tire in a tire curing mold is facilitated.

The engagement of the band, when expanded, with the belt G or with the restrictor ring 192 as described serves advantageously to prevent either turnup bladder, or either support bladder from displacing the band axially. We have found that despite extraordinary efforts such bladders do not act perfectly symmetrically. The belt G or the ring 192 also serves to prevent the expanded band from bulging outwardly and so increases the effective stiffness to resist axial displacement by the turnup means.

An additional advantage of the method and apparatus lies in building a precarcass band including but not limited to chafers, chippers, apex filling strips, shoulder wedges, undertread or sidewall parts. The band is assembled and consolidated on a rigid cylindrical building form, complete except for the radial tire breaker belt, tread and bead rings, before being placed on the shaping apparatus.

While certain representative embodiments and details have been shown for the purpose of illustrating the invention, it will be apparent to those skilled in the art that various changes and modifications may be made therein without departing from the spirit or scope of the invention.

What is claimed is:

1. A method of building a tire comprising in sequential combination the steps of:

disposing an endless carcass band loosely about carcass shaping means having a pair of carrier means movable symmetrically toward and away from a center plane fixed normal to the direction of movement of said carrier means and having band holding means axially fixed at said center plane and which carrier means are located initially at a first axial distance apart;

expanding circumferentially an axially narrow central portion of said band sufficiently only to resist axial displacement of said band by expanding said holding means to engage and to centralize said band with respect to the axis of said shaping means;

expanding said band circumferentially in two axial portions located symmetrically with respect to said central portion by expanding spreader means carried respectively by said carrier means;

smoothing and tensioning said band both axially and circumferentially by moving said spreader means while so expanded symmetrically axially away from said center plane to a second distance apart greater than the first-mentioned distance;

locating a first and a second bead ring respectively about and radially spaced outwardly of said band;

then fixing each said bead ring and said band relative to each other by expanding circumferentially beadseating means carried respectively on said carrier means adjacent to and respectively axially outward of the respective spreader means to expand circumferentially the axial zones of said band respectively immediately underlying each said bead;

shaping said band between said bead rings outwardly from said holding means by moving said carrier means axially symmetrically toward said center plane to a third distance between the bead rings which distance is greater than the maximum axial width of the tire when mounted and inflated for use and the first-mentioned distance and less than the second-mentioned distance while applying a first air pressure to expand said band;

causing said band to engage coaxially disposed annular restricting means disposed symmetrically of said center plane;

thereafter applying to said band adjacent to the axial zones underlying said bead rings, a second air pressure greater than said first pressure by expanding a first pair of bladders affixed circumferentially respectively to said beadseating means and extending axially inward respectively therefrom and concurrently;

turning the respective ends of said band radially outwardly around each said bead ring by inflating a second pair of bladders circumferentially affixed respectively to siad beadseating means and extending axially outward therefrom and by then inflating a third pair of bladders in contact with and circumferentially affixed on said carrier means to underlie respectively said second pair of bladders to urge the latter toward said first pair of bladders to compact said ends to the respective bead rings and opposing portions of said band;

thereafter removing the assembled tire.

2. A method as claimed in claim 1, wherein said band includes a pair of sidewalls, the further step, subsequent to inflating the second and third pairs of bladders, of adhering tire sidewalls to the outward sides of the toroidally shaped carcass band by bleeding inflation pressure from said second pair of bladders while maintaining inflation pressure in said third pair of bladders.

3. A method as claimed in claims 1 or 2, the further step, prior to turning said ends outwardly, of disposing an endless non-extensible belt symmetrically about the band to provide said restricting means and expanding said band by moving said carrier means to a spacing therebetween less than said third distance to fix the belt thereon.

4. A method as claimed in claims 1 or 2, wherein said annular restricting means is provided by a rigid band-engaging cylindrical surface whose circumference is less than the circumference of said carcass band in the tire when the tire is mounted and inflated for use.

5. A method of forming bead portions in a tire carcass comprising:

expanding circumferentially a narrow, axially central part of a carcass band sufficiently to hold said band axially;

positioning two bead rings radially outward of said band and at a first coaxial spacing therebetween;

expanding the band circumferentially in two narrow axial portions close to said central part and spreading said portions so expanded oppositely axially outward from the central part progressively to expand and smooth said band axially outwardly from its central part toward said bead rings;

expanding axial zones of said band respectively coplanar with said bead rings as so positioned to seat said bead rings circumferentially of said band;

moving the so seated bead rings axially toward said center part and further expanding said band by increasing air pressure acting radially outwardly on said band between the so seated bead rings;

then inflating a pair of annular bladders secured respectively adjacent to and extended axially inward from said zones to engage said band inward of each of said bead rings, and concurrently turning the band endings about and radially outward of the beads;

pressing said endings axially inwardly while said bladders exert axially outward uniformly circumferentially distributed force on said band around said beads; and subsequently completing and curing said tire carcass.

6. Method as claimed in claim 5 including fabricating said band in cylindrical form on rigid forming means; and moving said band freely axially over shaping means including expandable central part holding means and beadseating means to dispose a central part of said band in axial registry with said holding means.

7. The method of building a tire carcass comprising carrying an assembled carcass band freely axially over a tire shaping apparatus having an axis, expanding circumferentially a narrow central axial part of said band from about 1 to about 10 percent by expandable center means in said apparatus, expanding circumferentially two axial parts of said band symmetrically adjacent the central part by a pair of spreader means engaging the radially inner surface of said band, moving said spreader means symmetrically away from said central part to expand and smooth said band progressively outwardly away from said central part, positioning a pair of inextensible bead rings about the end regions of said band, then expanding said end regions to engage said bead rings and conform said regions thereto, locating diameter limiting means about the central part of said band, further expanding said carcass band between said bead rings to engage said limiting means while moving said bead rings symmetrically toward said central part to space said bead rings at a distance apart at least as great as the maximum distance between the tire sidewalls obtained when said tire is mounted and inflated for use, then concurrently inflating a pair of annular inner bladders respectively adjacent and axially inward of said beads and a pair of primary turnup bladders respectively adjacent and axially outward of said beads thereby to form a tight, hard bead turnup in said tire carcass.

8. A tire carcass shaping apparatus comprising first means for engaging the inward surface of and expanding an axially central part of a precarcass band and for holding the same axially with respect to the axial length of said band, second means for engaging the inward surface of the band adjacent to the central part and for progressively expanding and smoothing said band axially outwardly oppositely away from said first means, third means respectively disposed coaxially outwardly of said second means for engaging the inward surface of the band for expanding the same radially outwardly for conforming said band to prepositioned inextensible tire beads and operable to move said beads toward said central part while said part is further expanded by air pressure, and turnup means for turning the respective axial ends of said band outward of and about said beads.

9. Apparatus as claimed in claim 8, the apparatus further comprising a center shaft, said first means including: an annular plate fixed coaxially on the center shaft to define a mid-circumferential plane, a plurality of radial bores in said plate, each bore accommodating a radially movable piston and each piston having an arcuate bar thereon, the bars defining a circumferential support, an elastic endless ring disposed circumferentially around and supported by said circumferential support, and means for admitting pressurized air to said bores for moving the pistons radially outwardly of the shaft to expand said elastic ring.

10. Apparatus as claimed in claims 8 or 9, said second means comprising: a pair of annular discs, a plurality of bores formed radially in each of said discs, each bore accommodating a radially movable piston, each piston having an arcuate member fixed thereon, the plurality of arcuate members being movable radially of the shaft, an elastic endless element disposed around each disc and engaged by the respective arcuate members; passage means for admitting pressurized air for extending each said piston to expand said elements, and carrier means mounted on the shaft for movement respectively axially oppositely toward and away from said first means, said second means and said third means being secured, respectively to said carrier means.

11. Apparatus as claimed in claims 8 or 9, comprising a pair of carrier means mounted coaxially for movement symmetrically toward and away from said first means, said second means being affixed respectively to said carrier means, said third means comprising beadseating means mounted respectively on said carrier means, and lift means on said carrier means to expand said beadseating means.

12. A tire carcass assembly apparatus comprising turnup means including a first elastic bladder having first and second circumferential edges fixed radially with respect to an axis and an integral coaxial beadseating ring, said bladder including an inner wall extending from said first edge to said beadseating ring and having a circumferential pleat therein extending radially inward of said first edge while the bladder is in an unflated state, and a second wall extending axially from said second edge to a circumferential fold located axially distant from said seating ring, and an outer wall extending axially between said seating ring and said fold, whereby said seating ring can be expanded radially without stretching said inner wall axially in the region of said pleat; an inflatable second bladder disposed coaxially, radially inward of and contiguous to said second wall, and means for applying compressed air to expand independently of each other the first said bladder and said second bladder.

13. A tire carcass assembly apparatus comprising:
center shaft means having an axis:

a pair of carrier means disposed on the shaft means oppositely and symmetrically with respect to a center plane normal to said axis;

means for moving said carrier means symmetrically with respect to said center plane;

tire beadseating means carried by each of said carrier means, each said beadseating means comprising:

an endless solid elastomeric ring, a first and a second inflatable bladder each secured airtightly concentrically to said ring and extending when uninflated respectively axially oppositely outward and flaring radially outward from said ring to define with said ring a circumferential seat;

segment means defining a circumferential channel concentrically underlying said ring, said segment means including a plurality of rigid arcuate first segments spaced end-to-end circumferentially about the axis, a flange formed on each of said first segments and extending axially of said channel which flanges support said first inflatable bladder;

lift means mounted in said carrier means and operable to move said segment means symmetrically radially of said axis;

spreader means disposed coaxially inward of said channel, said spreader means comprising a plurality of arcuate members arranged end-to-end overlying and flanges and underlying said first bladder;

plunger means in said carrier means operable to move said members and said first bladder while the same is uninflated, symmetrically radially outwardly relative to said segments.

14. A tire carcass assembly apparatus as claimed in claim 13, including carcass band center ring means fixed axially of said shaft means coplanar with said center plane, said center ring means comprising an elastomeric ring having a carcass band-engaging surface, a plurality of segments arranged circumferentially in end-to-end relation underlying and supporting said ring, a center plate having a plurality of bores extending radially of said shaft means and spaced angularly thereabout, a plurality of pistons respectively received slidably in said bores and secured respectively to said segments, said pistons being movable radially of said shaft means to expand said ring symmetrically to expand an axially narrow central part of a carcass band disposed thereround not more than 10 percent of its radius but sufficiently to hold said band axially.

15. A tire carcass assembly apparatus as claimed in claims 13 or 14, said first and said second bladder each comprising a pair of cord ply reinforcements having cords disposed at about 68 to 90 degrees with respect to a plane normal to the axis, the respective axial ends of said reinforcements being embedded in said ring and when inflated exerting circumferentially uniform radially outward force tending to expand said ring.

16. A tire carcass assembly apparatus as claimed in claims 13, 14, or 15, each said first bladder having an axial length when not inflated of less than one-half the axial distance between the beads of the associated tire carcass while said carcass band is in its cylindrical form before shaping the same.

17. A tire carcass shaping apparatus comprising center shaft means, carrier means slidably disposed on the shaft means, turnup means mounted on the carrier means and including a solid elastomeric ring, two annular inflatable bladders each having at least a radially outer wall terminating in said ring, each having at least a radially outer wall terminating in said ring, each said wall having longitudinal cords embedded therein extending at opposite angles not greater than 22 degrees with respect to said shaft, each said wall extending outwardly from said ring at respectively opposite angles of at least 70 degrees with respect to said shaft means, whereby on being inflated said bladders exert circumferentially uniform force tending to expand said ring and cooperable with the ring to form a tire carcass band snugly about a tire bead.

18. An apparatus as claimed in claim 17, further comprising a plurality of circumferentially arranged segments cooperating to define a circumferential channel accommodating said ring, said segments being mounted for movement radially of the shaft to expand said ring.

19. An apparatus as claimed in claims 17 or 18, said segments each including an axially extending flange, the flanges defining a circumferential support for the axially inward one of said bladders.

20. A tire carcass assembly apparatus having a mid-circumferential reference plane comprising center shaft means, carrier means slidably disposed on the shaft means for movement toward and away from the reference plane, said carrier means comprising in combination a primary support sleeve slidably engageably with said center shaft means, a plurality of segments arranged circumferentially about said shaft means and mounted on said primary sleeve for radial movement with respect to the shaft means, beadseating means disposed circumferentially about said segments, turnup support means fixed coaxially of said primary sleeve, and spreader means mounted on said primary sleeve and including a plurality of circumferential members movable radially relatively of said segments and expandable to progressively expand concentrically and smooth a carcass band placed therearound during movement of said carrier means axially away from said reference plane.

21. A tire carcass assembly apparatus as claimed in claim 20, further comprising holding means for engaging the inward surface of and expanding a narrow axially central part of a precarcass band and for holding the same axially with respect to the axial length of the band during axially outward movement of said carrier means and spreader means.

22. A method as claimed in claim 5 or 6, further comprising resisting axial displacement of said band relative to mid bead rings during said pressing by locating diameter limiting means about the axially central part of said band and while further expanding said band by air pressure therewithin engaging said limiting means and said central part to resist said axial displacement.

* * * * *